Sept. 13, 1938.　　　N. P. LARSEN ET AL　　　2,130,140
VEHICLE BRAKING SYSTEM
Filed March 29, 1937　　　2 Sheets-Sheet 1
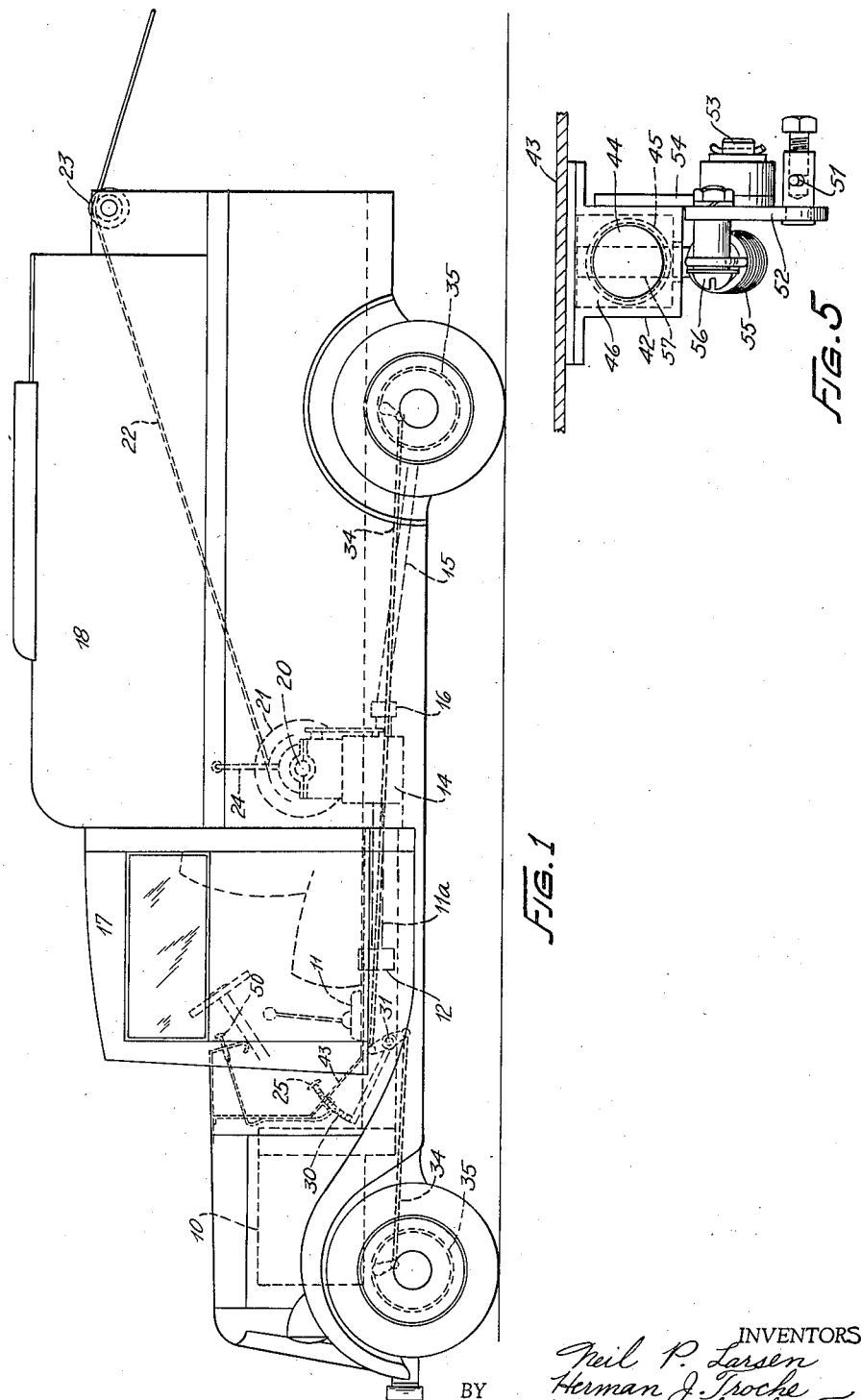
INVENTORS.
Neil P. Larsen
Herman J. Troche
BY Bates, Gohrick & Teare
ATTORNEYS.

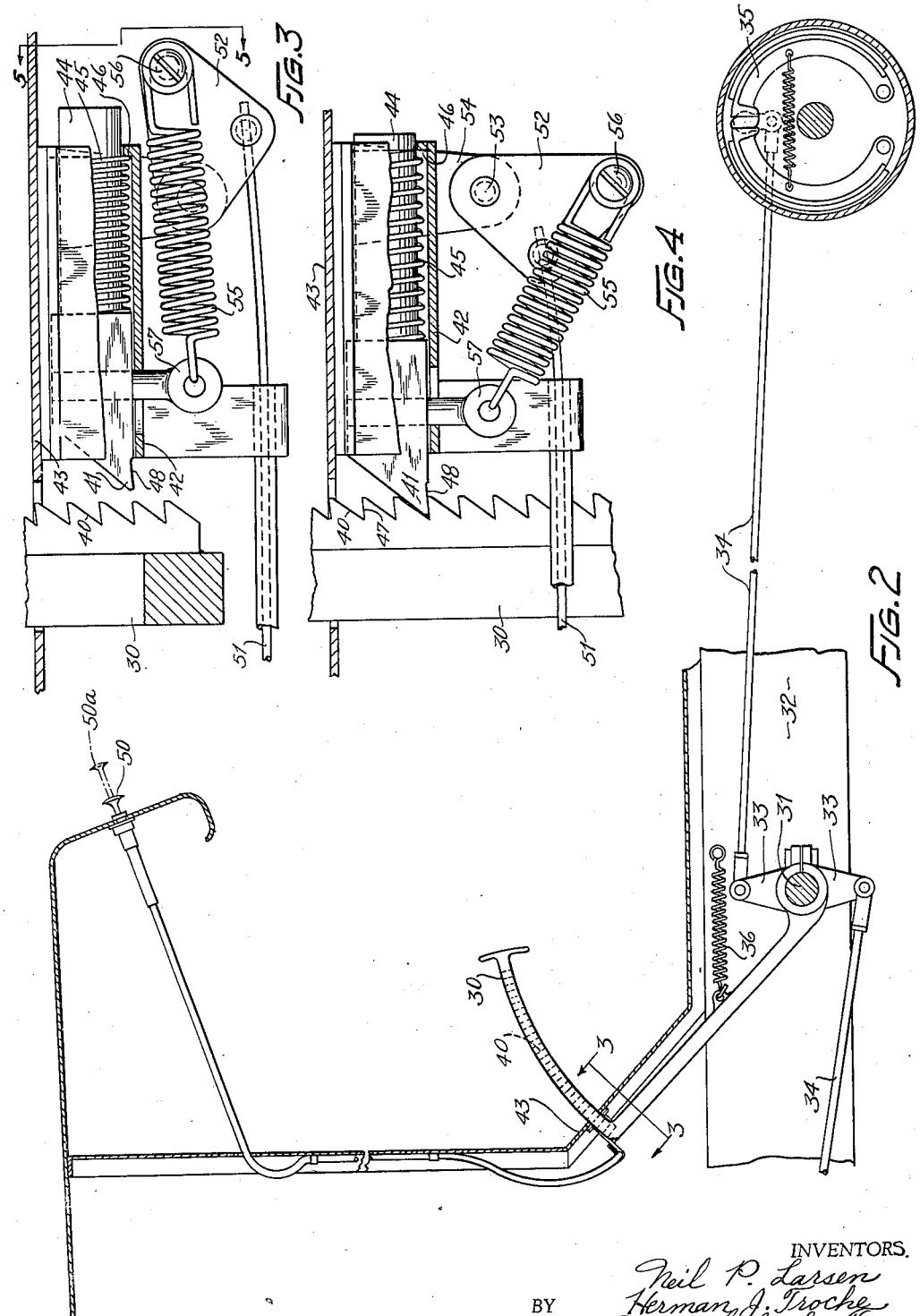

Patented Sept. 13, 1938

2,130,140

UNITED STATES PATENT OFFICE 2,130,140

VEHICLE BRAKING SYSTEM

Neil P. Larsen and Herman J. Troche, Cleveland, Ohio, assignors to American Coach & Body Company, Cleveland, Ohio, a corporation of Ohio Application March 29, 1937, Serial No. 133,536

4 Claims. (Cl. 74—540)

This invention relates to a brake operating mechanism, and especially to a brake hold-down device for trucks which are especially adapted for use by public utilities and the like. This, therefore, is the general object of the present invention.

Public utility and other corporations use, to a great extent, automotive trucks provided with an operator's cab and an equipment compartment or truck body for transporting employees and their equipment from place to place, especially in connection with the maintenance of service lines, such as gas lines, electric current, and telephone lines. Frequently such trucks carry a power-hoisting mechanism, operable by the truck motor, such hoists being advantageously used for raising poles, drawing cables and many other essential maintenance operations.

In the past, some difficulty has been encountered when a standard automotive vehicle chassis has been used for such trucks, inasmuch as it has been found to be disadvantageous to use the standard braking system of the vehicle without change, to maintain the vehicle stationary when the hoisting mechanism is used. When such a system has been utilized without change the connections between the hoist and the vehicle motor have become expensive and cumbersome.

In many instances, due to the construction of the standard automotive chassis, it has been found highly advantageous to connect the hoisting unit to the power plant of the vehicle between the transmission mechanism and the rear wheels of such vehicle. By so locating the hoisting unit, the changes required to be made in the original truck chassis and its driving mechanism are retained at a minimum. In trucks of this type, the emergency brake is frequently interposed between the transmission and the rear wheels. Generally this brake is applied to a power shaft closely adjacent the transmission housing and connected directly therewith. The propeller shaft is then connected between the brake and the rear axle. In such instances, the connection of the hoisting mechanism to the propeller shaft, between the brake and the rear wheels, prevents the use of this brake when the hoist is used, and therefore requires the continued presence of an operator in the cab to operate and maintain in operation the service or foot brake, so that the truck will remain stationary.

An object of the present invention, therefore, is to provide a braking system which will eliminate the need for an operator to remain in the cab while the hoisting mechanism is being used, and which will reduce, to a minimum, the changes in the standard brake and propeller system of the vehicle.

In other types of trucks, the emergency braking mechanism is connected directly to the brakes on respective rear wheels, and it has been found that these brakes, while being sufficient to maintain the truck stationary on normal grades, are nevertheless inadequate to maintain the truck stationary, when the hoist is used in connection with heavy loads. An object of my improved braking system, therefore, is to provide a system whereby the normal service braking system of the truck, which is generally connected to all wheels of the truck, may be used, either alone or in addition to the emergency braking system, to maintain the truck stationary, without the necessity of continued presence of an operator in the cab while the hoist is being used.

A further object of this invention is to provide a brake hold-down or locking mechanism for the service or foot brake of a motor vehicle, which mechanism, when released, will be rendered inactive to permit the functioning of the service brake in a normal manner,—that is, as though the hold-down mechanism were not present.

Other objects of the present invention will become more apparent from the following description, reference being had to the accompanying drawings, in which we illustrate a preferred embodiment of the invention. The essential features of the invention will be summarized in the claims.

In the drawings, Fig. 1 is a side elevation of a truck embodying our invention; Fig. 2 is a diagrammatic longitudinal section, illustrating our improved braking system; Fig. 3 is a sectional detail on an enlarged scale, the plane of the section being generally indicated by the lines 3—3 on Fig. 2; Fig. 4 is a sectional detail, similar to Fig. 3, but illustrating certain parts in a different position than illustrated in Fig. 3; Fig. 5 is a sectional detail, the plane of the section being indicated by the lines 5—5 on Fig. 3.

In the drawings, we have illustrated our invention as applied to a standard truck, of a type generally used by public utility corporations. As illustrated, this truck comprises the usual chassis, provided with a motor 10, which is connected with the usual transmission unit 11, which, in turn, is connected with a drive shaft 11a. Coacting with this drive shaft is an emergency brake 12. Normally, this drive shaft is connected directly to the rear axle by a suitable propeller shaft. However, as illustrated, the shaft 11a is connected with an auxiliary transmission 14, which in turn is connected by a propeller shaft 15 with the rear axle assembly in the usual manner through the medium of suitable universal joints, one of which is indicated at 16.

It will be noted that the auxiliary transmission 14 is located to the rear of the cab construction 17, and is within the van portion of the truck. This auxiliary transmission is connected in any well-known manner to a hoisting mechanism 20, which is controlled by a shift lever 24.

The hoisting mechanism, as indicated, comprises the usual hoisting drum 21, arranged to wind in a cable 22, which passes over a sheave 23 supported adjacent the rear and upper end of the truck, and which extends to the article to be raised, or pulled. It will be obvious from the construction illustrated, that if power is applied to the transmission 14 to operate the hoist, then the normal emergency brake 12 cannot be used. Wherefore, without the use of our invention, it is necessary for an operator to occupy the cab and maintain depressed the foot pedal 25, which is connected in the usual manner to the service brakes on all four wheels of the vehicle.

The present invention eliminates the need for the continued presence of an operator in the cab when the hoist is being used. This is accomplished by providing the foot-pedal mechanism with the retaining or hold-down mechanism, such mechanism being arranged and adapted to retain the foot pedal depressed, permitting the operator to leave the cab until such time as it is desired to again move the vehicle.

A release mechanism is provided which not only releases the foot pedal for active operation, but also renders the hold-down mechanism inactive, thus permitting the foot pedal or service brake operating mechanism to be actuated in the usual manner, without interference by the hold-down mechanism during the normal operation of the truck. This is a decided advantage, inasmuch as the service or foot brake mechanism may be operated in the usual manner, while the truck is being moved from place to place.

In Fig. 2 we have indicated the usual service brake pedal 30, as being secured to a shaft 31, suitably journalled in the frame or chassis 32 of the vehicle. This shaft 31 has secured thereto arms 33, which are connected by links 34 to respective brake mechanisms, one of which is generally indicated at 35. The service braking system may be of any of the well-known types found in present-day automotive vehicles, and therefore, is more or less diagrammatically shown in the drawings. It is to be understood, however, that the foot pedal is preferably connected to brakes on all four of the vehicle wheels. A spring, such as that indicated at 36, normally retains the pedal in the position illustrated in Fig. 2, in which position the brake mechanisms are idle, the arrangement being such that consequent upon the depression of the pedal 30, the brake mechanisms are rendered active.

Our improved hold-down mechanism is best illustrated in Figs. 3 and 4. As there shown, the brake pedal arm 30 is provided with a ratchet-like rack 40, which is arranged to be engaged by a sliding pawl or plunger 41. This plunger is slidably mounted in a housing 42, secured in any well-known manner to a relatively stationary part of the vehicle, such as, for instance, a foot board 43. The plunger 41, as shown in Fig. 4, has a rearwardly extending reduced portion 44, encircling which is a compression spring 45. This spring is interposed between a shoulder 46, formed by the rear wall of the housing 42, and the enlarged head of the plunger 41. The spring 45 acts in a direction to normally urge the plunger in a direction to coact with the rack 40, of the brake pedal arm 30.

The arrangement of the rack 40 is such that consequent upon the depression of the brake pedal, the plunger 41 will be cammed rearwardly against the action of its spring 45, enabling the pedal to be rapidly depressed. When, however, the pressure on the pedal is released, the substantially horizontal portion 47 of the teeth of the rack 40, are engaged by a substantially horizontal portion 48 of the locking plunger 41, retaining the pedal depressed and the brakes in active braking position, thereby permitting the operator to leave the cab of the truck.

The brake hold-down mechanism is released by the operation of a plunger or knob 50, which is preferably located on the dash or instrument panel of the truck, although it may be located in any desired position, where it will be convenient for the operator. This plunger is connected by the usual push-pull cable 51, with a plate 52, which is pivoted as at 53 to an ear 54, formed on the plunger housing 42. The arrangement is such that when the knob 50 is withdrawn to the dot and dash line position indicated in Fig. 2, at 50a, the plate 52 will be in the position shown in Fig. 4, and when the knob 50 is returned to the full-line position (Fig. 2) the plate is moved to the position shown in Fig. 3. A tension spring 55 is interposed between a pin 56 carried by the plate 52, and a pin 57 secured to and extending downwardly from the pawl 41.

The tension spring 55 is considerably stronger than the locking pawl spring 45, which normally retains the plunger 41 in contact with the rack 40. When the parts are in the position shown in Fig. 3, the spring 55 counteracts the pressure of the spring 45 and retains the plunger 41 in its withdrawn position, and as the spring is above the pivot 53, between the plate 52 and the housing 42, it also retains the plate 52 in position. When, however, the knob or plunger 50 is withdrawn to the dot and dash position 50a, indicated in Fig. 2, the tension spring 55 is swung to the position indicated in Fig 4, where it lies below the pivot 53, and exerts no force whatsoever upon the hold-down plunger 41, and hence the plunger 41 is free to move into active engagement with the pedal 30, under the impulse of its operating spring 45, heretofore described.

When it is desired to release the hold-down mechanism, the operator depresses the pedal slightly, to relieve the pressure between the pedal and the hold-down plunger 41, and then returns the control knob 50 from the position indicated at 50a in Fig. 2, to the full-line position. This tensions the spring 55, withdraws the hold-down plunger 41, and maintains the plunger in its withdrawn position.

From the foregoing description it will be seen that we have provided a simple mechanism, which is easily applied to existing vehicles for holding down the service brake pedal of an automotive truck or vehicle, thereby permitting the operator to leave the vehicle while utilizing the foot or service brake as an emergency brake, and we have so arranged this mechanism that it may be rendered active or inactive, as desired, and when inactive permits the use of the foot or service brake in the normal manner without in any way interfering with the normal operation of the vehicle, and it will be noted that the operation of the hold-down mechanism to release the service brake, automatically renders the hold-down mechanism inactive. This is a decided advantage, inasmuch as it permits the use of the hold-down mechanism in connection with the service brake of a motor vehicle, without in any way affecting the normal operation of the vehicle or safety to the passengers of the vehicle.

We claim:

1. A brake control system including a pedal operable to render a normally idle brake active, a latch for said pedal, a guideway housing secured to said vehicle and within which said latch is slidably mounted for movement toward and away from said pedal, a member pivoted to said housing, a spring pivotally connected at one end to said member at a point spaced from the pivotal connection between the member and the housing, and connected at its other end to said patch and adapted and arranged when tensioned to move and retain said latch out of engagement with said pedal, means pivotally connected to said member to swing said pivoted member about its pivot to selectively tension said spring, the various connections with said member being arranged and adapted to move the spring past a dead center position whereby said spring retains the member in a spring tensioning position consequent upon the positioning of said member by said manually operable means.

2. A brake control mechanism for a wheeled vehicle having brakes associated with certain of the wheels and adapted and arranged to prevent movement of the vehicle when rendered active, a foot operable pedal, a connection between the pedal and the brakes to cause the brakes to be rendered active consequent upon the depression of said pedal, resilient means normally acting to retain the pedal in an uppermost position, a rack carried by said pedal, a housing mounted on the vehicle adjacent said rack, a plunger slidably mounted in said housing, resilient means within said housing and normally acting to maintain the plunger in a coacting relation with said rack to retain the pedal in a depressed position, a member pivotally mounted on said housing, a pivot on said member and spaced from the pivotal connection between the member and the housing, a spring interposed between said pivot and said plunger and adapted and arranged when tensioned, to move and retain said plunger out of coacting relationship with said rack, a second pivot on said member spaced from the first pivot, a manually operable means carried by the vehicle remote from said spring, and a flexible connector between said manually operable means and said second pivotal connection.

3. A brake control mechanism for a wheeled vehicle having normally idle brakes associated with certain of the wheels thereof and adapted and arranged to prevent movement of the vehicle when rendered active, a foot operable pedal, a connection between said pedal and the brakes to render the brakes active consequent upon the depression of said pedal, resilient means normally acting to retain the pedal in an uppermost position, a rack carried by said pedal, a housing mounted on said vehicle, a latch slidably mounted in said housing for movement into and out of engagement with said rack, a spring in said housing and normally acting to maintain the latch in a coacting relation with said rack to retain the pedal in a depressed position and thereby maintain the brakes active, and means under control of the operator to release said latch from engagement with said rack, said means including a member pivotally connected to said housing, operating means for said member, a spring interconnected between said member and said latch, said member having spaced pivotal connections with the operating means and said last named spring respectively.

4. A brake control system including a pedal operable to render a normally idle brake active, a latch for said pedal, a housing secured to said vehicle and within which said latch is slidably mounted for movement toward and away from said pedal, a member pivoted to said guideway, a spring pivotally connected to said member at a point spaced from the pivotal connection between the member and the housing and adapted and arranged when tensioned to move and retain said latch out of engagement with said pedal, operating means pivotally connected to said member to swing said pivoted member about its pivot to selectively tension said spring, the various connections with said member being arranged and adapted to move the spring past a dead center position whereby said spring retains the member in a spring tensioning position consequent upon the positioning of said member by said operating means, wherein said operating means includes a flexible member pivoted above and to said pivoted member and extending to a point remote from said latch, and a flexible tubular sheath of a predetermined length enclosing said flexible member, one end of said sheath being secured to said latch housing and the other end of said sheath being secured to the vehicle at a point remote from said housing.

NEIL P. LARSEN.
HERMAN J. TROCHE.